US010863163B2

(12) United States Patent
Aurigema

(10) Patent No.: US 10,863,163 B2
(45) Date of Patent: Dec. 8, 2020

(54) VISION ENHANCING SYSTEM AND METHOD

(71) Applicant: Andrew Neil Aurigema, Oak Hill, FL (US)

(72) Inventor: Andrew Neil Aurigema, Oak Hill, FL (US)

(*) Notice: Subject to any disclaimer, the term of this patent is extended or adjusted under 35 U.S.C. 154(b) by 522 days.

(21) Appl. No.: 15/268,436

(22) Filed: Sep. 16, 2016

(65) Prior Publication Data

US 2017/0078645 A1 Mar. 16, 2017

Related U.S. Application Data

(60) Provisional application No. 62/219,311, filed on Sep. 16, 2015.

(51) Int. Cl.

| | |
|---|---|
| *H04N 13/239* | (2018.01) |
| *H04N 5/225* | (2006.01) |
| *G02B 27/01* | (2006.01) |
| *G02B 5/20* | (2006.01) |
| *B63C 11/12* | (2006.01) |
| *H04N 13/344* | (2018.01) |
| *H04N 13/254* | (2018.01) |

(Continued)

(52) U.S. Cl.
CPC ........... *H04N 13/239* (2018.05); *B63C 11/12* (2013.01); *G02B 5/208* (2013.01); *G02B 27/0172* (2013.01); *G02B 27/0176* (2013.01); *G02B 30/34* (2020.01); *H04N 5/2251* (2013.01); *H04N 5/2252* (2013.01); *H04N 5/2256* (2013.01); *H04N 13/254* (2018.05); *H04N 13/344* (2018.05); *B63C 2011/121* (2013.01); *G02B 2027/0138* (2013.01); *H04N 5/33* (2013.01); *H04N 2213/001* (2013.01)

(58) Field of Classification Search
CPC .............................. H04N 13/239; H04N 5/225
USPC ............................................................ 348/48
See application file for complete search history.

(56) References Cited

U.S. PATENT DOCUMENTS

| | | | |
|---|---|---|---|
| 6,082,858 A | * | 7/2000 | Grace .................... A61B 3/113 257/440 |
| 6,348,942 B1 | | 2/2002 | Watkins |

(Continued)

FOREIGN PATENT DOCUMENTS

| | | |
|---|---|---|
| CN | 201393283 | 1/2010 |
| CN | 102236161 | 11/2011 |

(Continued)

*Primary Examiner* — Amir Shahnami
(74) *Attorney, Agent, or Firm* — Stephen C. Thomas

(57) ABSTRACT

A digital vision system for use in turbid, dark or stained water is disclosed. Turbid water is opaque to the optical wavelengths viewable by humans but is transparent to near infrared (NIR) light. Using NIR wavelength illumination in turbid water allows viewing of objects that would otherwise not be visible through turbid water. NIR light is used to illuminate an area to be viewed. Video cameras comprising optical filters receive the NIR light reflected from objects in the camera field of view, producing camera video signals that may be processed and communicated to projector that convert the video signals to independent optical output video that is projected to the eye of the at optical frequencies viewable by humans. The user is thus provided with a real time vision system that allows the diver to visualize objects otherwise not visible using white light illumination.

5 Claims, 10 Drawing Sheets

(51) Int. Cl.
*G02B 30/34* (2020.01)
*H04N 5/33* (2006.01)

(56) References Cited

U.S. PATENT DOCUMENTS

| | | |
|---|---|---|
| 8,405,574 B1 | 3/2013 | Gallahger et al. |
| 9,124,877 B1 | 9/2015 | Riederer |
| 2002/0036779 A1* | 3/2002 | Kiyoi .................... G01B 11/24 |
| | | 356/606 |
| 2007/0296809 A1* | 12/2007 | Newbery ............. H04N 13/239 |
| | | 348/42 |
| 2013/0242110 A1* | 9/2013 | Terre ................... H04N 5/2251 |
| | | 348/164 |
| 2014/0327733 A1 | 11/2014 | Wagreich |

FOREIGN PATENT DOCUMENTS

| | | |
|---|---|---|
| EP | 2488135 | 8/2012 |
| EP | 2828148 | 1/2015 |
| EP | 2829056 | 1/2015 |

* cited by examiner

VISION ENHANCING SYSTEM AND METHOD

CROSS REFERENCE TO RELATED APPLICATIONS AND INCORPORATION BY REFERENCE

This non-provisional patent application is filed under 35 U.S.C. 111(a) and claims benefit of priority to U.S. provisional patent application No. 62/219,311 titled DIGITAL VISION SYSTEM FOR USE IN TURBID, DARK OR CLOUDED WATERS, filed in the United States Patent and Trademark Office (USPTO) on Sep. 16, 2015, which is hereby incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to systems and methods for enhancing vision when viewing objects through fluids, which may be liquids or gasses, especially in circumstances in which such fluids are dark, cloudy, turbid, contaminated or otherwise contain pollutants or particulate matter that operate to reduce the clarity of view of an area to be viewed.

2. Background of the Invention

As an example of one problem to be solved by the invention, much of the world's water ways used for commercial marine activity contain stained, dark, silted, or cloudy water that makes underwater diving activities difficult due to near zero visibility conditions. It is under these near zero visibility conditions that divers must work in near to complete blindness, using feel or touch. The lack of visual stimulus during prolonged work cycles can cause headache, fatigue, vertigo disorientation and other productivity reducing physiologic issues. The underwater vision system of the invention, provides a real time, first person, high resolution view to divers when working in these low to zero visibility waters. The system and method of the invention addresses the problems associated with low to zero visibility vision for the diving community, and for any other user who wishes to achieve a higher degree of clarity of vision in such low visibility environments as was previously attainable.

The system and method of the invention has many applications. One such application is that in which it is desired to view through fluids when working inside biological organisms, such as during invasive medical procedures. Remote viewing through opaque fluids such as blood, bile, lymph, and urine are possible using the system and method of the invention.

Another application is that in which a user desires to view objects when working inside petroleum drilling, storage, transport and other containment equipment. Remote viewing through petroleum products such as crude oil, refined oils, drilling solutions and distilled petrochemical products is also possible using the system and method of the invention.

Thus, while a detailed description of the system and method of the invention are presented herein as relates to viewing through low visibility water, such as when diving, uses for applications such invasive medical procedures, petroleum environments, and any application in which it is desired to view through a fluid are within the scope of the system and method of the invention Turbid water is opaque to the range of light wavelengths commonly described as white light or human eye visible light. Human vision is receptive to light energy of wavelength in the 450 nm to 650 nm range, commonly referred to as "white light". Prior art underwater imaging and imaging based vision augmentation systems rely on distribution of white light illumination sources to light up the objects of interest in the aquatic environment. White light illumination does not penetrate turbid water to any useful distance due to the physics of light scattering and absorption by suspended particles and the fluid media itself. The combination of scattering, absorption, and extinction of supplied illumination sources and the natural limitations of the human eye operate to deny divers a useful optical experience in most dark water diving conditions. Typical turbid or dark water vision is two to six inches from the diver's mask no matter how much illumination is provided. Adding more illumination does not improve a diver's range of vision or signal to noise ratio so the diver has no further natural vision improvement options.

Backscatter, side scatter, absorption and dissipation of artificial or natural light off particles in the turbid water negate the transmission of light in cloudy water. Without light transmission there is no vision. Conventional underwater imaging systems are limited to a few inches or range and require hundreds to thousands of lumens of white light illumination. Other concepts for imaging in turbid water require clean water to be pumped in front of the diver displacing the turbid water with a stream of clear water. This is only effective in limited range and until the clear water supply runs out. These prior art systems are cumbersome, bulky and require frequent maintenance.

Some systems have been developed to aid in viewing through turbid fluids. However these systems, which typically generate a single video stream, merely replicate a single view of a total field of view that requires a user's brain to process the video imagery in an unfamiliar format. Some of these systems will strobe between processed and non-processed video, or left and right eye, which is difficult for the human brain to process in real time. This has been shown to cause spatial disorientation, nausea and fatigue on the part of the user. In certain environments which may be inherently dangerous, such us underwater diving environments, the resulting spatial disorientation, nausea and fatigue can greatly reduce mission effectiveness and could potentially be dangerous.

What is needed in the art, therefore, is an apparatus and/or method adapted to be used in low visibility fluid environments that operates to allow enhanced vision to a user, allowing for deeper field of view and enhanced clarity, that overcomes the reduced signal to noise ratio caused by light scattering and absorption by suspended particles in the fluid.

BRIEF SUMMARY OF THE INVENTION

The present invention comprises an apparatus and method that have one or more of the following features and/or steps, which alone or in any combination may comprise patentable subject matter.

In a basic configuration, the system and method of the invention utilize NIR wavelength optical energy to view objects in an area desired to be viewed, optionally illuminating the area with NIR light to increase viewability distance, but in any event receiving NIR energy into at least one camera that is capable of receiving NIR optical energy and converting it to at least one camera video signal, which may be subsequently processed to convert from NTCS to digital video, producing at least one processed video signal. The at least one processed video signal is communicated to at least one video projector that converts the at least one processed video signal to at least one optical output video projection that comprises optical wavelengths viewable to the human eye. Thus, the invention views a scene in NIR and converts the received video to human-eye viewable video for viewing by a human, i.e. at wavelengths from about 400 nm to about 700 nm. The use of NIR to view the desired area greatly reduces light scattering by suspended particles, thus allowing viewability for far greater distances in turbid water than would otherwise be achievable using white light.

There are many applications in which it is desired by a user to visualize, in real time, a scene or area that is, to the unaided human eye, occluded from view by an intervening media containing particulates, contaminates or other matter. As a non-limiting example, much of the world's water ways contain dark, stained, silted, or cloudy water that makes underwater diving difficult due to near zero visibility. The system and method of the invention, provides a real time ability for divers to obtain a view of the target area in such situation, thus providing vision through the intervening media causing the occlusion. Vision through other opaque fluids such as petroleum products, blood, bile, lymph, and urine are also possible using remote sensors and this augmented vision system. The invention claimed here solves these vision problems.

Turbid water is opaque to white light due to scattering and absorption of the illumination source, but it is semi-transparent to Near Infrared light (NIR) in a very narrow window of wavelengths. By illuminating objects using these NIR light wavelengths, illumination of targets is possible in a greatly expanded range of turbid and stained water and other fluids. Objects illuminated with NIR light are not visible to the unaided human eye without aid, but with the use of the viewing system of the invention, these objects can be made clearly visible to users such as divers at ranges limited only by the intensity of the supplied NIR illumination light energy. A diver using the system of the invention observes the underwater area to be viewed by looking with both eyes through a diver's mask at the optical output video projections produced by the invention. These projections provide a true 3D stereo image to the diver's eyes in high contrast, monochrome, white light. The diver sees a real time video stereoscopic image created by multiple imaging cameras and real time video processors that is greatly increased in contrast and sharpness as compared to natural vision in dark or turbid water. The turbid water is naturally semitransparent to a select range of NIR light and therefore the diver is now provided with a vision system that is operating in a media that is semi-transparent at NIR wavelengths.

In accordance with one embodiment of the present invention, the invention comprises two independent video signal paths, a first video path and a second video path. In each video path, the received NIR light energy first passes through an optical filter that passes NIR light energy and blocks light energy of wavelength shorter than NIR, resulting in filtered NIR light energy. Next the filtered NIR light energy in each of the first and second video paths illuminate independent first and second video cameras, the first video camera being placed in the first video path, and the second video camera being placed in the second video path. Each video camera comprises electronics capable of converting the received NIR light energy to an electrical camera video signal. The resulting first and second electrical camera video signals then are communicated to independent video processors, where the video may be converted from NTSC analog to digital video, and combined with text, graphic or other desired display information, to produce independent first and second processed video outputs. Each of the first and second processed video outputs are communicated to independent video projectors that convert the processed video signals to optical output signals for view by the user. The first and second cameras also comprise lenses, and each have a field of view. The field of view of each camera is directed towards an area to be viewed, and the fields of view of the first and second cameras may overlap such that a portion of each camera's field of view are coincident with one other, or overlap. The first camera and second camera are disposed so as to mimic the position of the left and the right eye of the user, which is to say, for example, that, relative to the user's left and right eyes, the first camera axis may be substantially collinear with the axis of field of view of the user's left eye, and the second camera axis may be substantially collinear with an axis of the field of view of the user's right eye. This disposition of the cameras places them apart from each other with a distance between them that is substantially equivalent to the distance between the user's left and right eyes. The optical output video projected to the user is comprised of substantially parallel light rays, so that the video images presented to the eyes of the approximate natural sight. In this embodiment, a stereoscopic vision system is created by the invention. The stereoscopic and spatial characteristics of the video image projected to the user's eyes thus provided by the invention represent a significant improvement in the state of the art because it greatly reduces the nausea caused by viewing systems of the prior art. This is because the user's brain is much more easily able to process the video provided by the current invention as opposed to prior art systems. Additionally, use of the present invention results in less fatigue than systems of the prior art for the same reason. In further embodiments, the camera lenses of the invention may be adjusted for field of view and disposed such that the overlapping field of view of the cameras substantially mimics the field of view of the user.

Other embodiments of the invention may produce a single video data stream, with a single, or mono, projected optical output.

The present method and device of the invention overcome the shortcomings of the prior art by utilizing a wavelength of light energy, namely NIR wavelength, that is longer than a critical wavelength, where the critical wavelength is defined as the longest wavelength that suspended particles reflect light energy. For many useful applications, the critical wavelength is between 750 nm and 800 nm. The present invention uses optical filters to filter out wavelengths that are shorter than the critical wavelength from light energy that is reflected into the viewing system by particles. The critical wavelength in any application is a wavelength below which most of the light energy is reflected from a particle, and above which only a small percentage, for example less than 5 percent, of the light energy is reflected from the particle.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

DETAILED DESCRIPTION OF THE INVENTION

Figure 1:
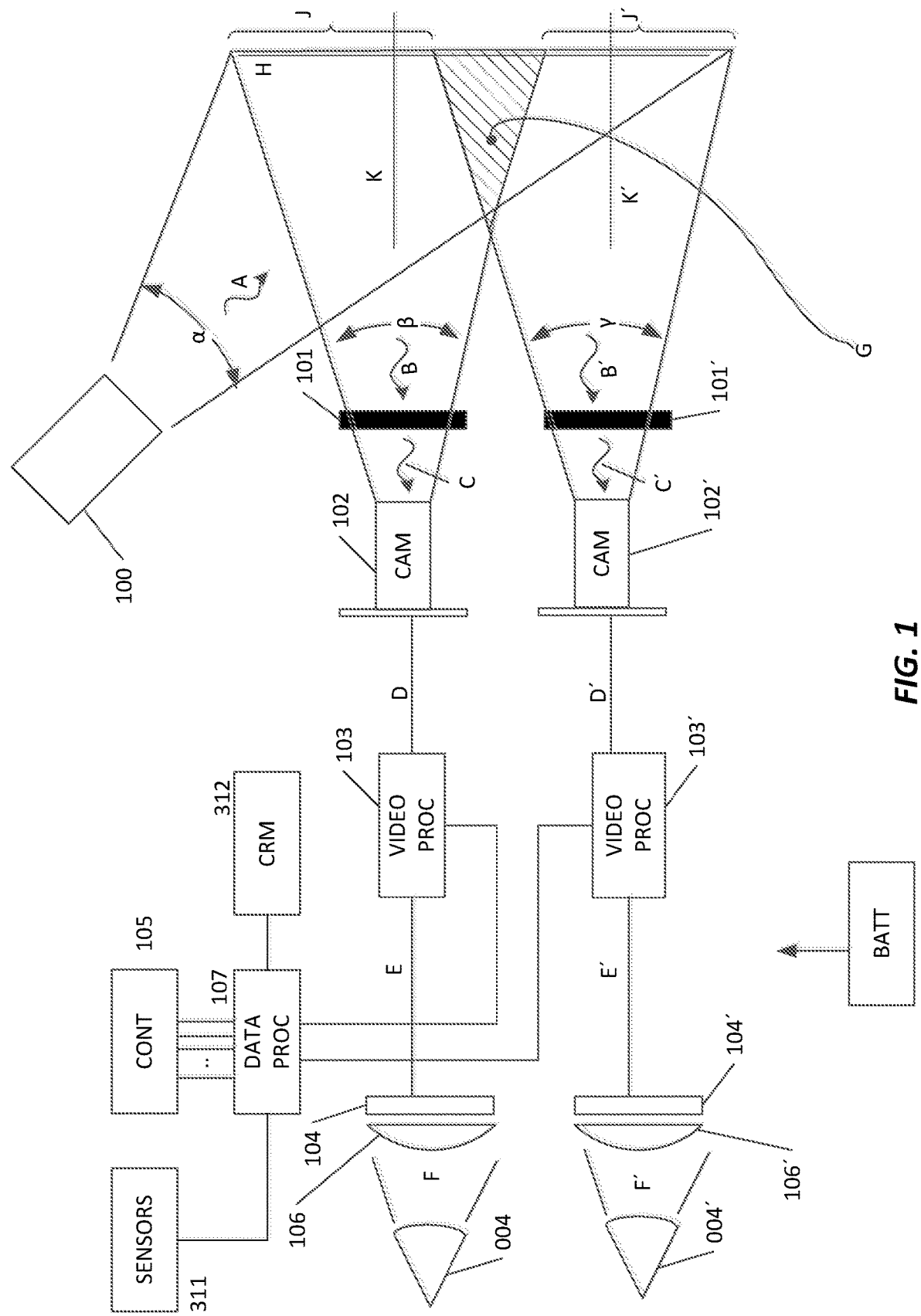
FIG. 1 depicts a block diagram of an embodiment of the invention in which the system is a stereo system.

The following documentation provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

The system of the invention uses NIR wavelengths to view through turbid environments, such as turbid water. The invention receives NIR optical energy, converts the received NIR energy to camera video signals, processes the cameral video signals to produce processed video signals, and converts the processed video signals to projected optical video in wavelengths that are viewable by the unaided eye of user. The system may be, but is not necessarily, a stereoscopic system. The system may be a mono system.

Turbid water is opaque to white light due to scattering and absorption of the illumination source but it is semi-transparent to NIR wavelengths in a very narrow window of wavelengths. Using these selected NIR light frequencies, underwater illumination of targets is possible in a greatly expanded range of turbid and stained water and other fluids. Targets illuminated with NIR light are not visible to the unaided human eye because the human eye is not receptive at these frequencies, but with the use of a camera, or digital imaging device, sensitive to NIR, video processors, and an image projection system these targets can be made clearly visible to divers at ranges that are only limited by the intensity of the supplied NIR light. The higher the intensity of NIR illumination light, the further a diver using the system and method of the invention can see in the turbid environment. The diver observes the underwater scene by looking with both eyes through the diver's mask at the stereoscopic video produced by the projectors of the vision system. These projectors work in concert to provide a 3D stereoscopic image to the diver's eyes in high contrast, monochrome, white light. The diver sees a real time video stereoscopic image created by multiple imaging cameras and real time video processors that is greatly increased in contrast and sharpness as compared to natural vision in dark water. The use of NIR frequencies instead of white light to illuminate the viewing area means the diver's view is no longer clouded due to the reduced signal to noise ratio caused by the scattering and absorption of light due to the particulates in the turbid water. The turbid water is naturally semitransparent to a select range of NIR light and therefore the diver is now provided with a vision system that is operating in a semi-transparent media.

Turbid, stained or clouded water may contain micro particles of dye, organics (such as tannin), ions, salts and inorganic materials that absorb, scatter, attenuate or otherwise prevent the transmission of visible light through the fluid media. Through the use of digital imaging cameras, narrow band short wave near infrared, NIR band pass filters, digital processing and a first person projection system, the system of the invention provides real time vision to a diver in near zero to zero visibility water. The enhanced vision is projected into the diver's natural vision path by the vision system projectors. By use of high intensity, NIR underwater illumination sources, targets in the fluid media are illuminated and become clearly visible to the diver. The optical scattering effect of micro particles, tannin, organics, silt and other particulates in the fluid media is significantly reduced by the use of NIR illumination light energy with a frequency range of 750 nm to 950 nm, or optionally narrower wavelength illumination at 830 nm to 890 nm, optical energy at as opposed to use of white light illumination light energy at source frequency from normal human vision sensitive white light (450 nm to 650 nm). The longer the illuminating source's wavelength, the larger the particle is needed to scatter the source. Particles in water greater than one (1) micron tend to settle out given time and lack of perturbation. Particles less than one (1) micron that stay in suspension are the source of the water's turbidity as they tend to scatter blue, green and red light to various degree. The system and method of the invention is not receptive to light energy at wavelengths shorter than NIR, and thereby eliminates the optical noise associated with most particulate light scattering. Both signal and noise wavelengths longer than and equal to 810 nm are passed into the invention and only this high signal to noise ration wavelengths are used to create an enhanced vision experience for the diver. There is an emphasis on monochromatic (non-coherent) illumination within this range. By supplying 100% of the illumination source at a single frequency, all other frequencies of light can be selectively filtered and eliminated. Choosing a NIR wavelength that penetrates turbid water and selectively eliminating all other wavelengths greatly increases the signal to noise ratio of the received optical energy that is used by the invention to project a viewable video output to a user's eyes. There is also a frequency within this range that maximizes the transmission of energy though water (thereby maximizing the range of the augmented vision). There is also a series of signal to noise increasing digital image processing steps that comprise the invention. The invention may comprise multiple image capture sensors and independent left eye and right eye video streams. True 3D perspective is achieved by supplying unique left eye and unique right eye visual information. Reduced magnification lenses and hyper-stereo placement of the cameras may be used to counteract the natural magnification of water-to-air imaging and loss of field of view due to image projection.

As used herein, "memory", "medium", "media", "computer readable memory", "computer readable medium", "storage media", "computer readable storage media" and "computer readable storage medium" shall include within their meanings only physical non-transitory computer readable hardware, and such terms shall specifically exclude signals per se, carrier waves, propagating signals and other transitory signals. Such physical non transitory computer readable media may comprise hardware memory that comprises a physical structure for storing data which may include computer executable instructions or data.

As used herein, "processor" and "controller" shall include within their meaning any hardware device, combination of devices or emulated hardware device that is capable of executing non-transitory computer readable instructions.

As used herein, "NIR" means light energy in the range of 750 nm to 950 nm.

Turbid water is opaque to white light but it is semi-transparent to a narrow range of NIR light. Using NIR frequency underwater illumination instead of white light illumination allows for lighting up and viewing of objects that would otherwise not be visible. By using an imaging system sensitive only to NIR light, the diver is able to see objects in the water that normally would not be visible. Switching the diver's vision from visible light to NIR frequencies means the diver is no longer fighting the physics of VIS illumination in turbid water. The turbid water is naturally semi-transparent to NIR light and therefore, using the system and method of the invention, the user is now provided with a vision system that is operating in a semi-transparent media.

The narrow wavelength clarity enhancing vision system and method of the invention, in an embodiment, may comprise one or more illumination units for illuminating an area to be viewed; one or more narrow band optical notch filters, which may also include polarization filters, to control the intensity, wavelength or polarity of the optical signal reaching the imaging sensors of the cameras; one or more video cameras; one or more video processors, each in communication with a video camera, for producing a video image that is visible to a human eye; and one or more video projection units, each in communication with a video processor, for projecting the processed video to the eye of a user. The one or more illumination units illuminate an area to be viewed. The video cameras each have a field of view that is at least partially coincident with the illumination area. Because the video image is projected real-time to the eye or eyes of a user, it is designated a "first-person" viewing system.

In an embodiment, the system and method of the invention may comprise a first optical filter and a second optical filter, a first video camera and a second video camera, a first video processor and a second video processor, and a first video projection unit and a second video projection unit, wherein light reaching the first video camera must first pass through the first narrow band optical notch filter, and light energy reaching the second video camera must first pass through the second narrow band optical notch filter, and wherein the first video camera is in communication with the first video processor which is also in communication with the first video projection unit, all forming a first video path; and the second video camera is in communication with the second video processor which is in communication with the second video projection unit, all forming a second video path. The video image from the first video path is projected to a first eye of a user, for example the user's left eye, and the video image from the second video path is projected to a second eye of the user, for example the user's right eye. In this manner a stereo system is formed, providing stereo view to the user, an independent video channel for each eye.

In yet a further embodiment, the system of the invention may be contained within a housing that is used in combination with an underwater diver's mask such that the system may be placed in a diver's line of sight when desired. The housing may be watertight. In this manner, in this embodiment of the system of the invention, the invention may be worn by a user while diving, the electronics may be kept dry from the surrounding underwater environment, and the user may use the system to view through turbid or cloudy water. The housing may be attached to the diver's make using a system of mechanical brackets allowing the invention to flip up relative to the diver's mask when it is not desired to be used, or to be stationary relative to the diver's mask (i.e. fixed in position). The exemplary embodiments of the invention depicted in the figures is an embodiment in which the invention may be flipped up relative to the diver's mask such that the diver is able to view through the mask without using the invention.

In yet a further embodiment, the system of the invention may comprise non-transitory computer readable media in communication with the one or video processors of the invention for storing video, thus providing a recording of the video as received by the one or more video cameras.

In yet a further embodiment of the invention, the system of the invention may comprise a wireless transceiver, which may be a radio frequency, optical or other wireless transceiver, in communication with a controller that is also in communication with the one or more video processors, for wirelessly transmitting video information to a remote receiver. The controller may execute non-transitory computer readable and executable instructions causing video data to be wirelessly transmitted through the transceiver to a remote user in real time, or may cause video data that is stored in the computer readable media to be transmitted to a remote user upon command. In this manner a remote user may download video information stored in the non-transitory computer readable media or may monitor video real time while the system and method of the invention are in use. In the non-limiting example of underwater use, a remote monitor may be able to monitor the video as received by the one or more cameras of the invention real time as a diver is viewing an underwater scene. Such remote monitoring could be useful, for example, in search and rescue or recovery operations by law enforcement or the like.

A still further embodiment of the invention may comprise one or more sensors for sensing environmental, system status or other parameters. The one or more sensors may be in communication with a controller that is in communication with the one or more video processors of the invention. The controller may read and execute computer readable and executable instructions, causing the sensed environmental information, system status, or other information to be added to the video signals by the one or more video processors so that it is displayed by the one or more video projection units for viewing by a user. Thus, by way of example, in the case of underwater use, information such as water temperature, water depth, time of day, date, elapsed dive time, diver biometric data, amount of breathing gas remaining, compass heading, vision system battery life remaining, and other sensed parameters may be displayed so that the user is apprised of this information, which may be very useful for enhancing the diver's situational awareness.

Any embodiment of the invention may also comprise a battery for powering all the electronic and electrical components of the invention.

Figure 10:
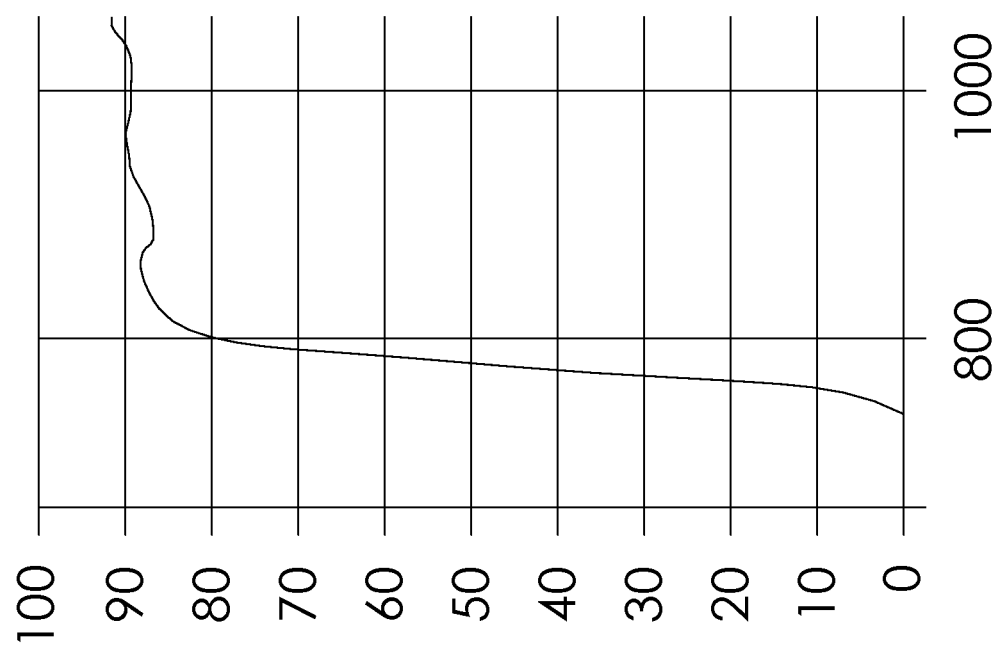
FIG. 10 depicts the optical transmission characteristics of an embodiment of the NIR optical filters of the invention.

Referring now to FIG. 1, a block diagram of an embodiment of the invention in which the system is a stereoscopic system is depicted. In this embodiment, an area to be viewed H may be illuminated by an optional illumination source of light energy 100. The illumination source 100 emits light energy A that may be characterized by beam width α. Light energy A is directed at the area to be viewed H such that H is at least partially illuminated by the light energy emitted by the illumination source 100. The frequency of emitted illumination light energy A may be any light source that emits light at wavelengths longer than 750 nm, but may more specifically be characterized as being light energy having a peak output centered at 850 nm and having a 50% Imax bandwidth of +/−30 nm. In this manner, the area to be viewed H is illuminated by NIR light energy. Light energy A emitted from illumination source 100 may be reflected by objects within the beam width of illumination source 100 such that the light energy B and B' reflected from objects within the field of view of the first or second video cameras 103 or 103', respectively, is directed towards the system of the invention. Light energy B and B' may enter the viewing system of the invention by passing through first optical filter 101 and second optical filter 101', respectively. First and second optical filters 101 and 101' may be characterized being transmissive at NIR wavelengths, and being non-transmissive at wavelengths shorter than NIR. More specifically, the first and second optical filters 101 and 101' may be further characterized as comprising a material that passes less than 10% of light energy at wavelengths below 850 nmm, and transmitting more than 80% of light energy at wavelengths greater than 800 nm, as depicted in FIG. 10. Thus, light energy C and C' passing through first and second optical filters 101 and 101' are of NIR wavelength. Light energy C enters first video camera 102 and light energy C' enters second video cameras 102'. Video cameras 102 and 102' are each able to receive NIR optical energy and convert the received NIR optical energy to a first and second output camera video signal (i.e., video cameras 102 and 102' are IR, or infrared, video cameras). Light energy C and C' are converted to electrical first and second camera video signals by first and second video cameras 102 and 102', respectively, resulting in first electrical camera video signal D and second electrical camera video signal D', respectively. First electrical video signal D and second electrical video signal D' are independent video signals, and are independently communicated to first video processor 103 and second video processor 103', respectively, each of which may also be in communication with data processor 107. Data processor 107 may also be in communication with human interface device or devices 105, which may be a combination of human interface devices, such as switches, buttons, touchpads or other means or devices known in the art for providing input by a human to a controller or processor. Data processor 107 may also be in communication with one or more sensors or other circuit elements 311 that may provide input signals to data processor 107. These input signals may comprise environmental information such as temperature, water depth, dive system telemetry, or other environmentally sensed information. These input signals may also comprise date and time information and any other information that may be desired to be displayed to the user. Geolocation information such as Global Positioning System (GPS) information may also comprise sensor data. Thus, sensors 311 may comprise geolocation receivers, environmental sensors, dive equipment sensors, time units, or any other device capable of providing useful information as input signals to data processor 107. These input signals are communicated to first video processor 103 and second video processor 103' by data processor 107, where the information they contain are combined with the respective electrical camera video signals by video processors 103 and 103', such that first processed video signal E and second processed video signal E' contains information derived from the sensor input signals for display to a user. Data processor 107 may be in communication with non-transitory computer readable media 312 which may comprise non-transitory computer readable and executable instructions for receiving input signals from sensors 311 and control elements 105 and communicating information from sensors 311 to video processors 103 and 103'. For example, any of the information from the input signals may be displayed as text or other symbols on first video display 104 or second video 104' for projection to a user by the first and second projectors. Thus, date, elapsed time, actual time, water depth, temperature, geographic position and the like may be displayed to the user. Data processor 107 may be in communication with a non-transitory computer readable media containing non-transitory computer readable and executable instructions for carrying out the functions of the invention. First video processor 103 and second video processor 103' may independently operate on the first camera video stream D and the second video stream D' respectively, and may be in independent communication with first video display 104 and second video display 104', respectively. First video processor 103 may produce a first processed video signal E, and second video processor 103 'may produce a second processed video signal E', each of which are communicated to the video projectors of the invention. A first video projector comprises a first video display 104 that converts the first processed video signal to a first optical output for projecting through lens 106 to be viewed by first eye of a user. A second video projector comprises a second video display 104' that converts the second processed video signal to a second optical output for projecting through lens 106' to be viewed by a second eye of a user. Lenses 106 and 106', respectively, focus the output light energy from the first video display 104 and second video display 104' into a first eye 004 and a second eye 004' of the user, respectively. For example, first eye 004 may be the left eye of a user having a field of vision F, and second eye 004' may be the right of a user having a field of vision F'. Thus as depicted in FIG. 1, the system and method of the invention provides two independent video channels each of which are projected independently to the field of view of the eyes of the user.

Data processor 107, computer readable media 312, and sensors 311 are each independently optional.

In an embodiment, the first and second camera video signals may be defined as NTSC (National Television System Committee) signals, and first and second processed video signals may be defined as digital video signals. First and second processors 103 and 103' may convert first cameral video signal D and second camera signal D', respectively, to digital video signals.

Still referring to FIG. 1, it can be seen that first video camera 102 and second video camera 102 each have a field of view characterized by an angle. First video camera 102 as a field of view characterized by angle β and a field of view axis defined by K. Second video camera 102 is characterized as having a field of view of angle γ and a field of view axis defined by K'. The field of view of first video camera 102 and the field of view of second video camera 102' may overlap at area G. Taken together, the field of view of first video camera 102 and the field of view of second video camera 102' may cover the area desired to be viewed H. Furthermore, there may be areas which are in the field of view of one camera but not in the field of view of the other camera. For instance, first camera 102 may have within its field of view area J which is not in the field of view of second camera 102'. Likewise second video camera 102' may have within its field of view area J' which is not in the field of view of first camera 102. It can be seen then that, due to the independent video streams being projected simultaneously into a first eye of a user 004 and a second eye of a user 004', a first-person real time stereoscopic vision system that approximately replaces the natural vision of the user results. It is desirable, but not necessary, that the distance between first video camera 102 and second video camera 102' approximate the distance between the eyes of the user 004 and 004'. First video camera 102 may be characterized further by an axis K about which first video camera 102's field of view is substantially centered. Second video camera 102 may be characterized further by an axis K' about which second video camera 102''s field of view is substantially centered. It is desirable, but not necessary, that axes K and K' be parallel. Axes K and K' may be disposed so as to converge at a desired distance from first video camera 102 and second video camera 102'. The stereoscopic first-person video perceived by the user may be, but is not necessarily, adjusted to approximate the field of view of the user's natural eyesight, with overlapping field of use of eye's 004 and 004' at area G, and with areas of peripheral vision J and J'. First video camera 102 and second video camera 102' may further comprise lens assemblies adjustable such that field of view angles β and γ may be adjusted to further facilitate the approximation of the field of view of the user's natural eyesight.

Figure 2:
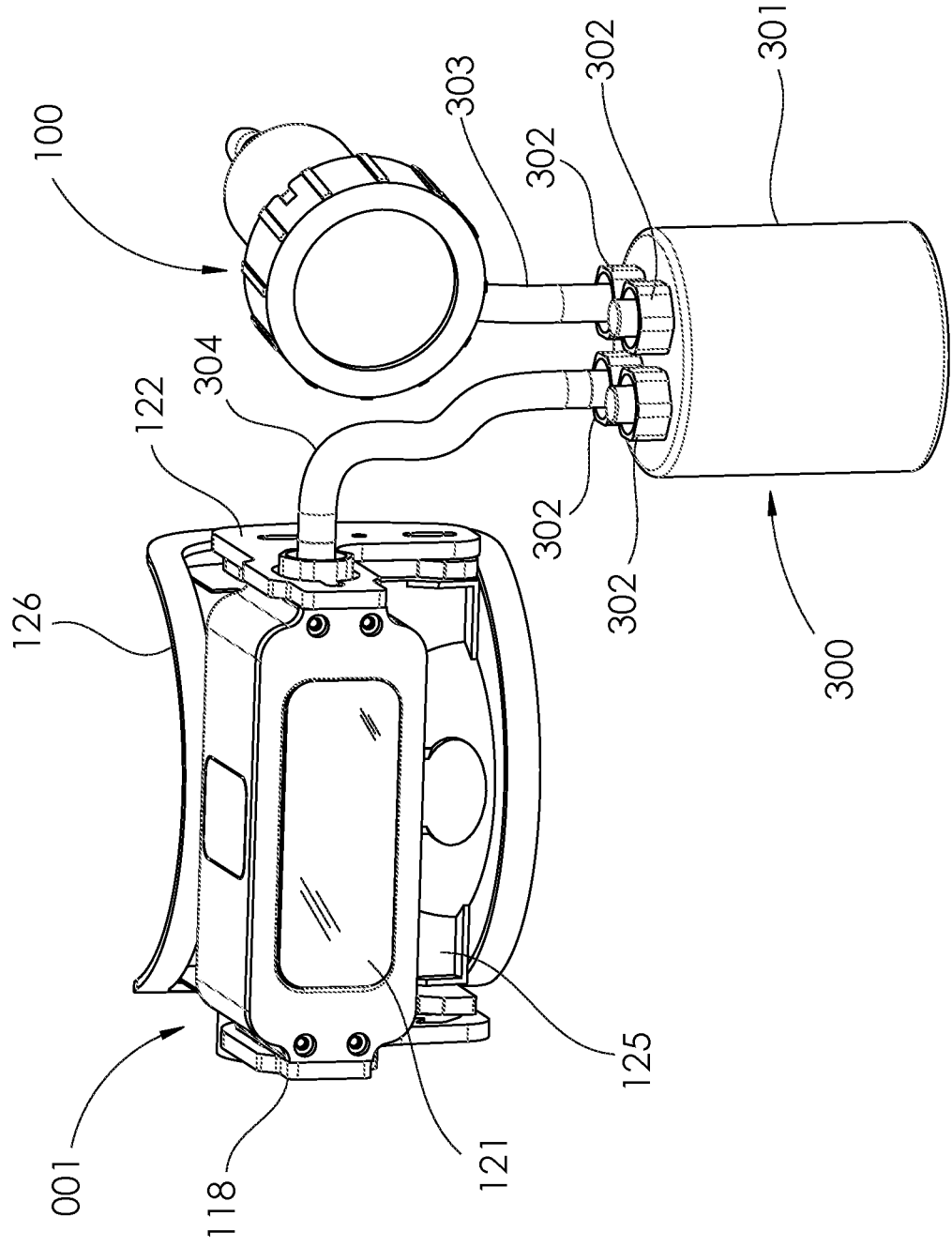
FIG. 2 depicts a perspective view of an embodiment of the narrow wavelength clarity enhancing system of the invention, in which the invention is adapted for underwater use.

Referring now to FIG. 2, a perspective view of an embodiment of the narrow wavelength clarity enhancing system of the invention, in which the invention is adapted for underwater use, is depicted. In this embodiment of the invention, the viewing system 001 of the invention is attached to an underwater diver's mask such that the diver views through the transparent viewing window of the mask 125 into the video projectors of the invention. The particular embodiment depicted in FIG. 2 is a stereoscopic system. The invention may comprise an optional battery assembly 300, an optional illumination source 100, and a viewing system 001. In an embodiment, the invention may utilize any external illumination source or naturally occurring NIR light energy, and may be powered from any external electrical power source, and in this embodiment the invention may only comprise viewing system 001. In the embodiment depicted in FIG. 2, however, the invention comprises a battery assembly 300 and an illumination source 100. Viewing system 001 may be attached to a diver's mask 126 by any means, such as a combination of brackets attached by threaded fasteners. In the embodiment shown in FIG. 2, viewing system 001 is attached to diver's mask 126 by a mechanical system for flipping viewing system 001 into or out the diver's field of view as desired by the diver. Brackets 122 and 118 may attach to viewing system 001 and also attach to the divers mask 126. Battery 301, which may comprise a watertight battery housing, may be connected to the electronics inside viewing system 001 by watertight cable 304 which has watertight electrical connections 302 at either end area battery 301 may also be connected to illumination source 100 by watertight cable 303 which also has watertight connections 302 at either end. In this manner, electrical power is provided by the battery through watertight connections and cabling to both the electronics inside doing system 001 and illumination source 100. Battery 301 may also comprise extra electrical connections 302 for powering other equipment. Optical input window 121 is shown for reference.

Figure 3:
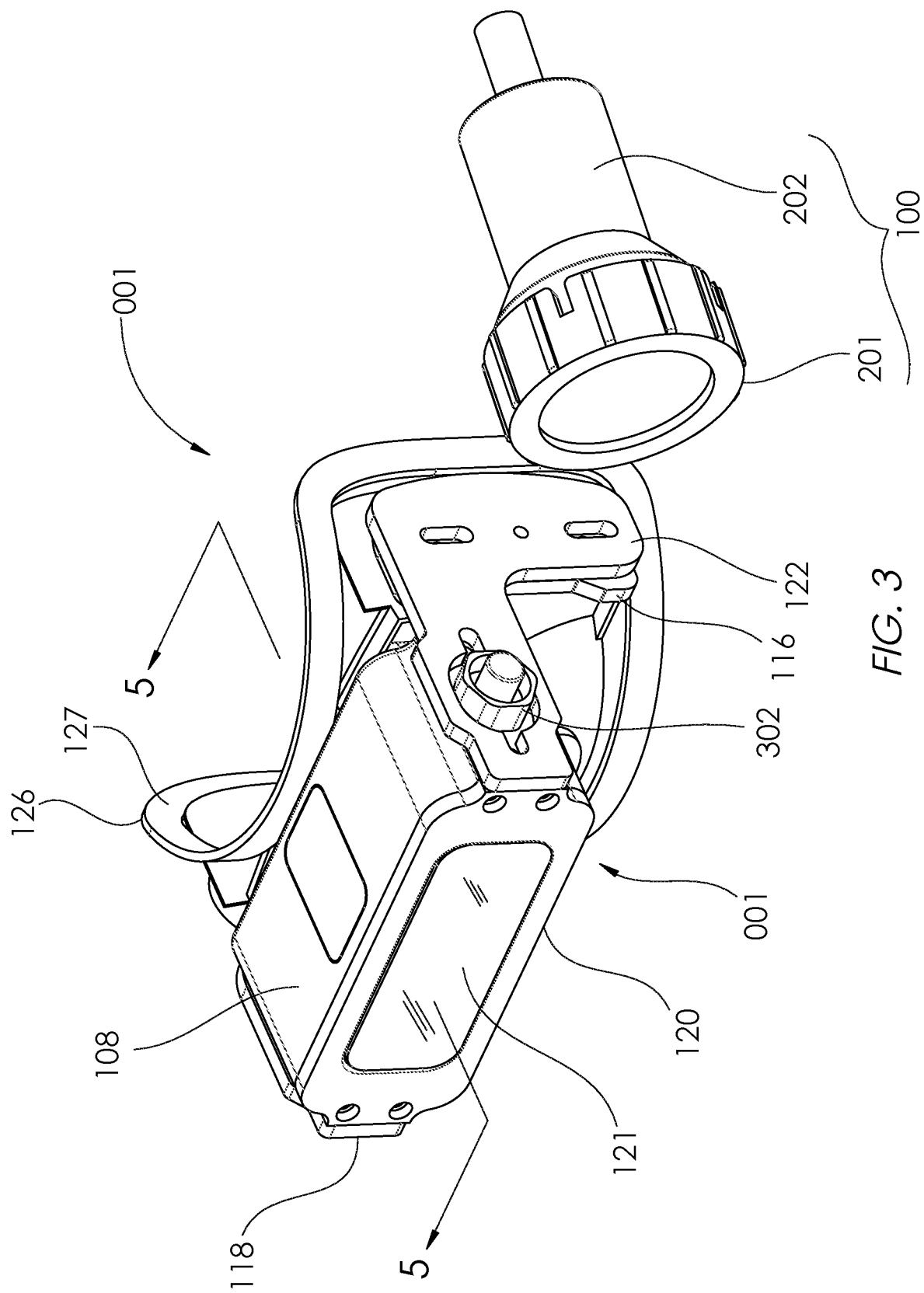
FIG. 3 depicts a side perspective view of an embodiment of the narrow wavelength clarity enhancing system of the invention, in which the invention is adapted for underwater use, not showing the optional external battery assembly.
Figure 4:
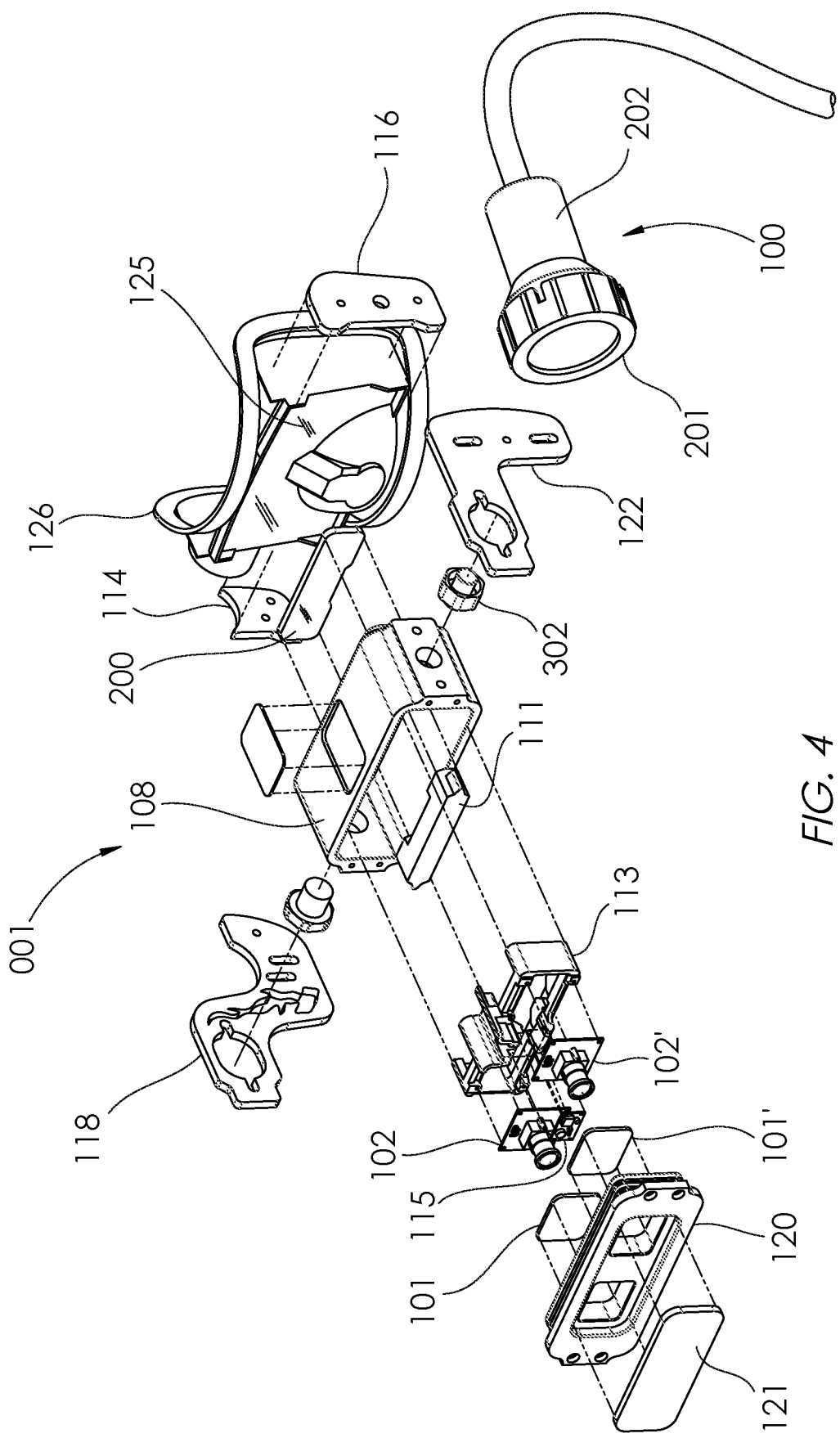
FIG. 4 depicts an exploded perspective view of an embodiment of the narrow wavelength clarity enhancing system of the invention, in which the invention is adapted for underwater use. In this figure, the optional external battery assembly is not shown.

Referring now to FIG. 3, a side perspective view of an embodiment of the viewing system of the invention 001, in which the invention is adapted for underwater use, not showing the optional external battery assembly, is depicted. Illumination source 100 may comprise a housing 202 and a lens assembly 201 which together may, in this embodiment of the invention, provide a water tight housing for the light emitting elements which may be, for example, light emitting diodes (LEDs) or any other light emitting source. First bracket 122 and second bracket 118 are adapted to mount or attach viewing system 001 to a diver's mask 126. First bracket 122 and second bracket 118 may attach to diving mask 126 directly or through intermediate plates or brackets such as first intermediate plate 116 using any mechanical means such as threaded fasteners. The use of intermediate plates may allow for the flipping up of the mask by pivoting the mask one point on another. Bracket 118 may be attached to diver's mask 126 through a second intermediate plate 114 which is not depicted in FIG. 3 but is depicted in FIG. 4. Optical input window 121, housing 108, front plate 120, diver's mask sealing surface 127 and connector 302 are identified for reference.

Referring now to FIG. 4, an exploded perspective view of an embodiment of the viewing system of the invention 001 is depicted. In this embodiment the invention is adapted for underwater use by a diver. In this figure the optional external battery assembly 300 is not shown. The viewing system of the invention 001 may comprise a housing 108, a front plate 120 which further comprises an optical input window 121, and an optical output window 200 all of which may work together to form a watertight enclosure. Light energy may enter the viewing system 001 through optical input window 121 and may pass through a first optical filter 101 and second optical filter 101' where it is filtered in accordance with the transmissive qualities of the first and second optical filters. These filters may be transmissive at wavelengths at 750 nm or longer, and may be non-transmissive at wavelengths shorter than 750 nm. The filtered optical energy then enters the lenses of first video camera 102 or second video camera 102' as previously described. First video camera 102 and second video camera 102' may be attached to camera housing 113 and may be in electrical communication with data processors 103 and 103' as hereinbefore described, which may in turn be in communication with the first projection system and the second projection system, each of which may be housed within projection system housing 111. The first and second projection systems may be disposed within projection system housing 111 such that their projected video output is projected through optical output window 200, through the transparent viewing window of the mask 125 of diver's mask 126 and into the left and right eyes of a diver. In this manner, stereoscopic first-person video is provided to the diver. The system of the invention may also comprise illumination source 100 which may be comprised of illumination source housing 202 illumination source lens assembly 201. Illumination source 100 may be attached to the brackets or other mechanical components of the system so that a diver is able to operate the system of the invention without holding illumination source 100, thus freeing the diver's hands. First bracket 122, second bracket 118, first intermediate bracket 116, second intermediate bracket 114, diver's mask sealing surface 127, illumination source 100, illumination source housing 202 and illumination source lens 201 are all shown for reference. Watertight electrical connection 302, through which electrical conductors connect the electrical components of viewing system 001 to an external power source such as, for example, battery assembly 300, is also shown for reference.

Figure 5:
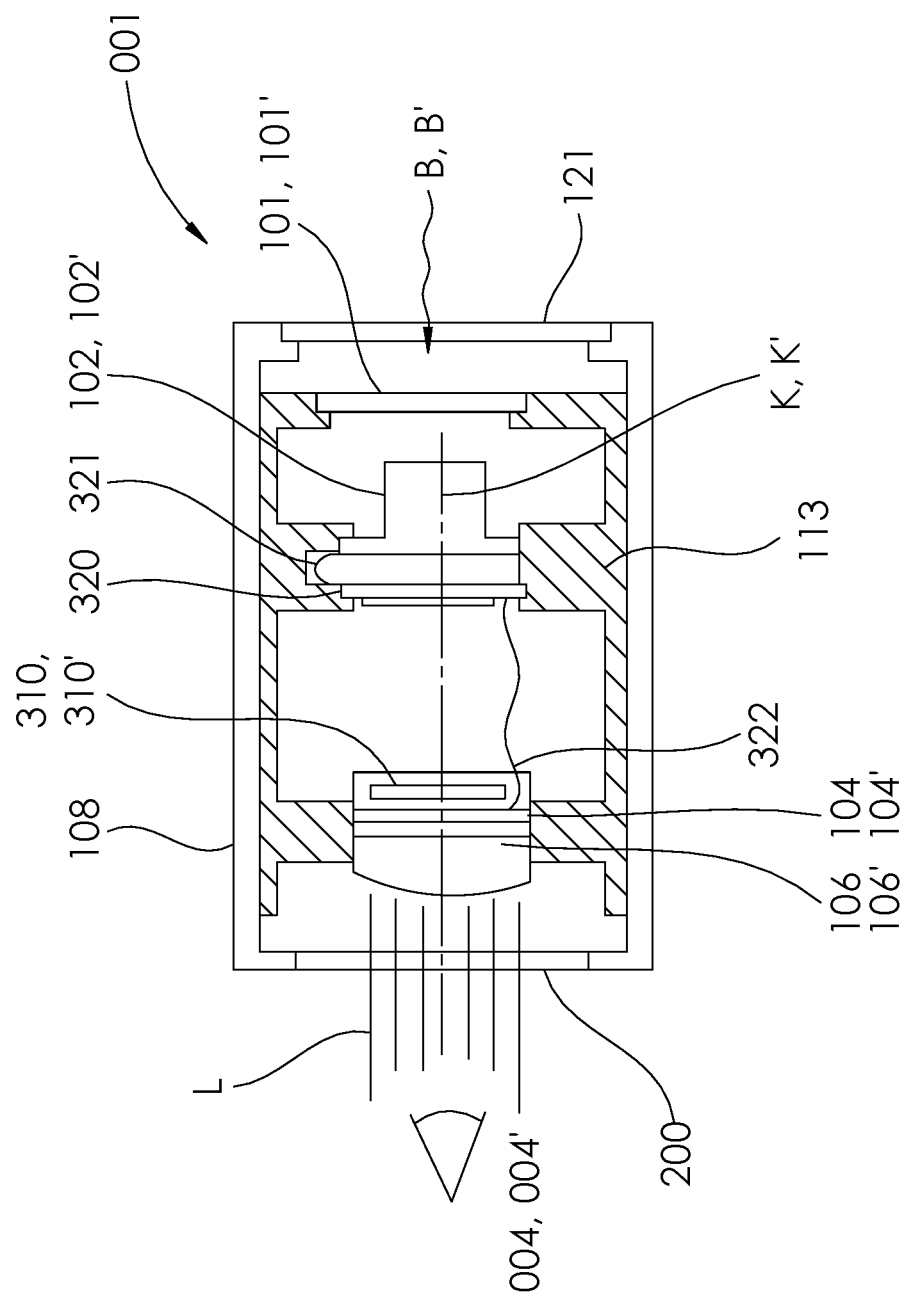
FIG. 5 depicts a cross section view of an embodiment of the viewing system of the invention.

Referring now to FIG. 5, a cross section view of an embodiment of the viewing system 001 of the invention is depicted. The optical, electrical and electronic components of the system may be disposed within a viewing system housing 108, which may be a watertight enclosure in the embodiment of the invention intended for underwater use. A watertight seal between optical input window 121 and housing 108, and a watertight seal between optical output window 200 and housing 108, may operate to provide this watertight enclosure. Internal housing 113 may be disposed within viewing system housing 108, where it may be used for mechanically capturing first optical filter 101 and second optical filter 101'. Internal housing 113 may also mechanically capture first video camera 102 and second video camera 102', as well as a printed wiring assembly or printed circuit board assembly 320 which may comprise first video processor 103 and second video processor 103', as well as optional data processor 107, non-transitory computer readable media 312 comprising non-transitory computer readable and executable instructions for receiving input signals from sensors 311 and control elements 105 and communicating information from sensors 311 to video processors 103 and 103', and other electrical and electronic components as are necessary to implement the functions of the system. These electrical components of the system are depicted in FIG. 1 are not shown in the side view of printed wiring board or printed circuit board assembly 320 depicted in FIG. 5. The electrical and electronic components comprising printed wiring board or print circuit board assembly 320 may be in electrical communication with first video camera 102 or second video camera 102' by a cable 321 and may be in communication with first video projector 104 and second video projector 104' by cable 322. First video projector 104 may be an LCD display with back light 310, and second video projector 104 may be an LCD display with back light 310'. In operation, in the stereoscopic embodiment of the invention addicted, a first video output and a second video output are generated by the invention. Each independent video output is processed and independently projected by either first video projector 104 and second video projector 104' through projector lens 106 or 106', respectively, producing a projected output video comprising parallel projected output light rays L as depicted in FIG. 5. These parallel projected output light rays are received by the eyes of the user 004 and 004'. Light energy B and B' enter the viewing system of the invention through optical input window 121 as described elsewhere herein. Camera axes K and K' are shown for reference.

Figure 6:
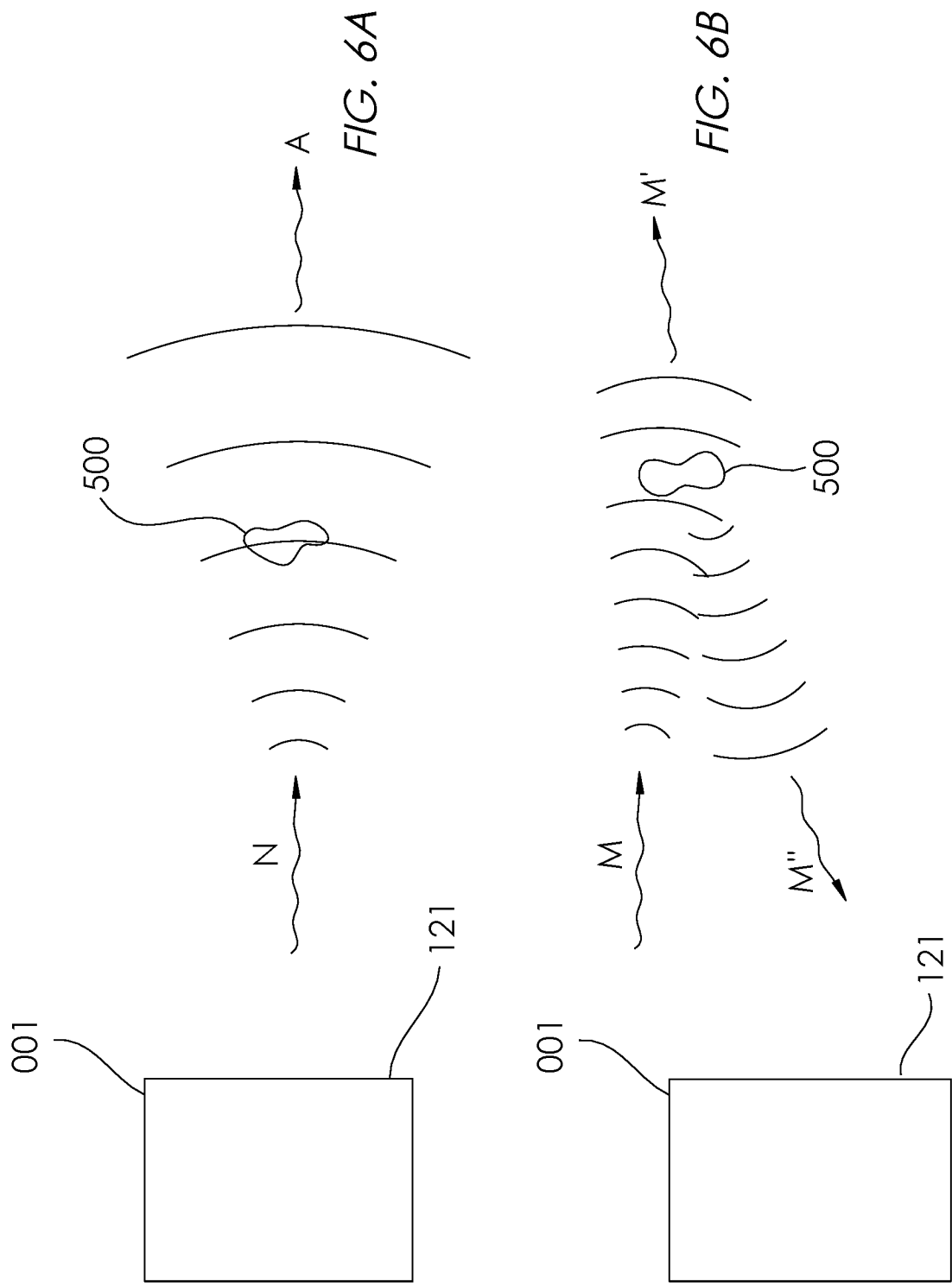
FIG. 6A depicts the illumination of a particle by the illumination source of the invention. This figure depicts an object of dimension less than a critical dimension for reflecting the narrow wavelength optical energy illuminating the object, so that very little, or no, light is reflected from the object.
FIG. 6B depicts the illumination of a particle by the illumination source of the invention. This figure depicts an object of dimension greater than a critical dimension for reflecting the narrow wavelength optical energy illuminating the object, so that light is reflected from the object.

Referring now to FIG. 6A the illumination of a particle by the illumination source of the invention is depicted. This figure depicts an object 500 of dimension less than a critical dimension for reflecting the narrow wavelength optical energy illuminating the object, so that very little, or no, light is reflected from the object. In an embodiment, the critical dimension is approximately 750 nm Light energy N of wavelength longer than the critical dimension is not substantially reflected by object 500, and thus does not cause light scattering. The viewing system of the invention 001 with optical input window 121 is shown for reference.

Referring now to FIG. 6B depicts the illumination of a particle by the narrow wavelength illumination source of the invention. This figure depicts an object 500 of dimension greater than a critical dimension for reflecting the narrow wavelength optical energy illuminating the object, so that light is reflected from the object. In an embodiment, the critical dimension is approximately 750 nm. Light energy M of wavelength longer than the critical dimension is substantially reflected by object 500 resulting in backscatter M" towards the viewing system of the invention 001, and thus object 500 is apparent to the user and occludes viewing object beyond object 500 that may be illuminated passing light energy M'. Optical input window 121 is shown for reference.

Figure 7:
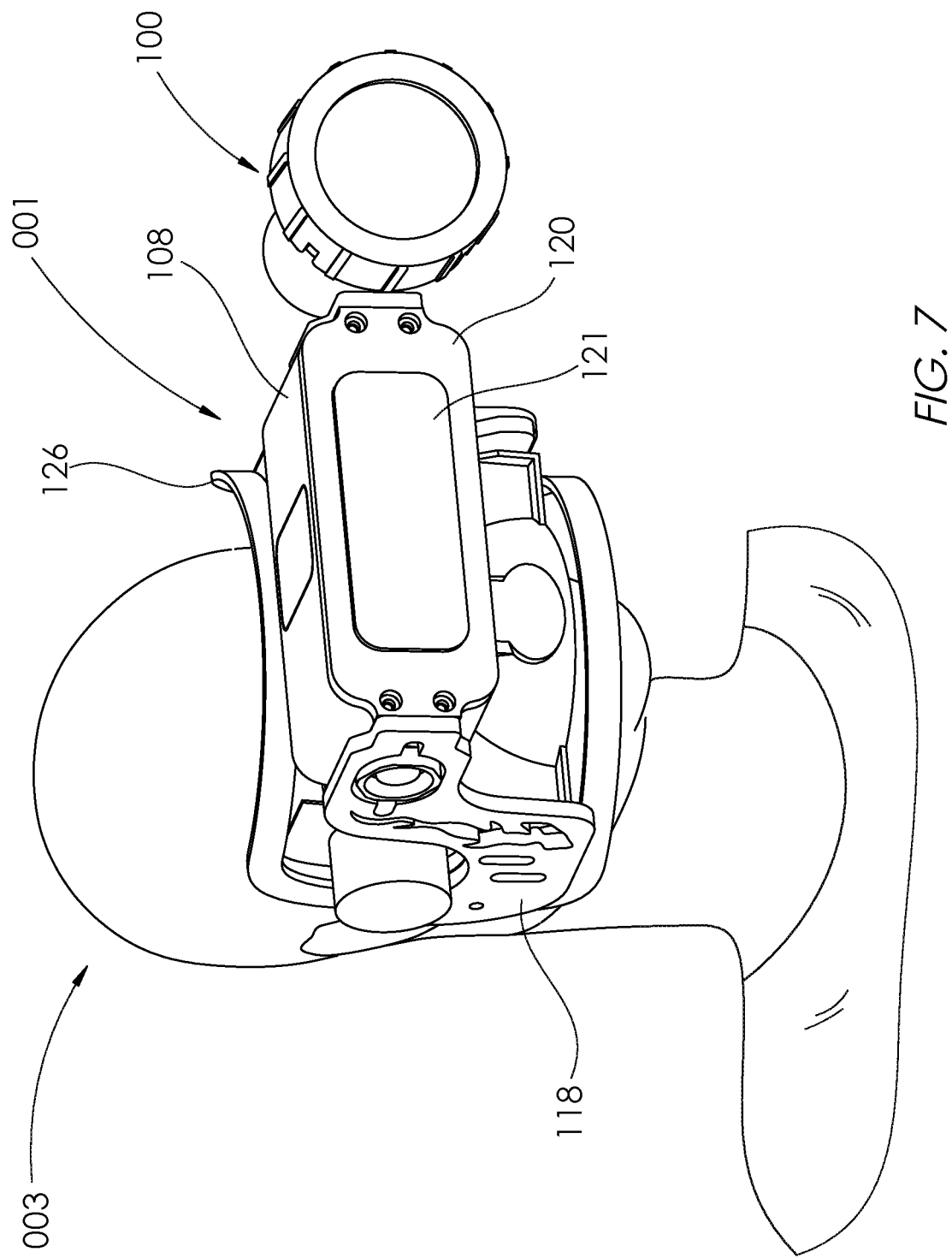
FIG. 7 depicts a perspective view of an embodiment of the clarity enhancing system of the invention, in which the invention is adapted for underwater use, as would be worn by an underwater diver. The embodiment and use show in this figure is exemplary, and is one of many embodiments the invention may take.

Referring now to FIG. 7, a perspective view of an embodiment of the vision enhancing system of the invention 001, in which the invention is adapted for underwater use, as would be worn by an underwater diver 003. The embodiment and use shown in this figure is exemplary, and is one of many embodiments the invention may take. Divers mask 126, viewing system housing 108, viewing system front plate 120 optical input window 121, illumination source 100 and second bracket 118 are shown for reference.

Figure 8:
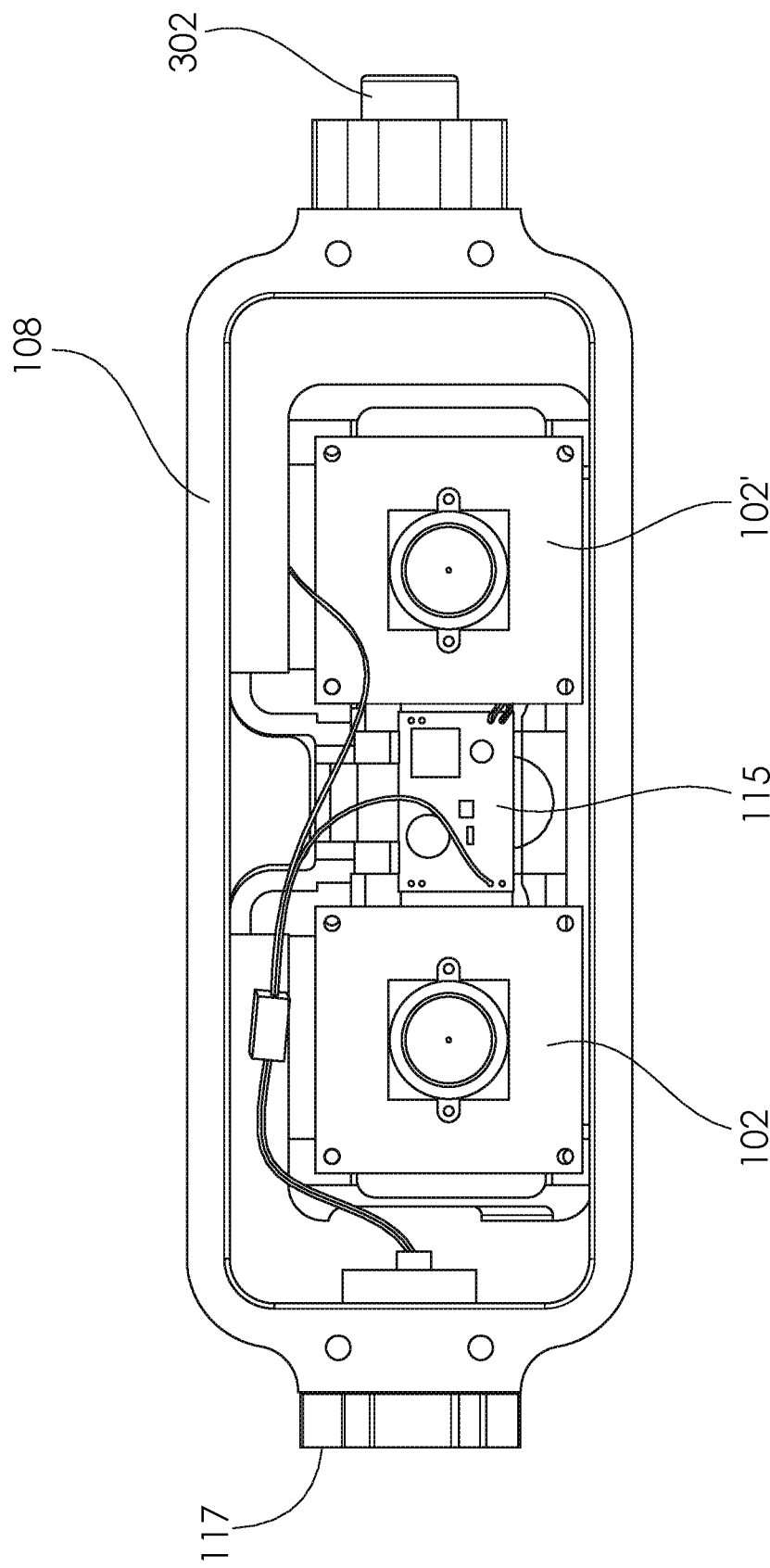
FIG. 8 depicts a front orthogonal view of the viewing system of the invention with the optical input window and first and second optical filters removed.

Referring now to FIG. 8, a front orthogonal view of an embodiment of the viewing system of the invention with the viewing system front plate 120, optical input window 121 and first and second optical filters 101 and 101', respectively, removed, is depicted. Electronics assembly 115 may comprise some of the electronic devices of the invention and may be connected to first video camera 102 and second video camera 102' by electrical wiring and connectors as is known in the art. Watertight electrical connection 302 may be utilized to bring the electrical conductors into viewing system housing 108 for the purpose of bringing signals or electrical power to the components of viewing system within viewing system housing 108. Knob 117 may be a threaded knob and may be used to tighten second bracket 118 to second intermediate bracket 114 (not shown in FIG. 8). In the case in which viewing system 001 of the invention is attached to a diver's mask 126 using brackets that are adapted to allow the viewing system to be flipped up of a diverse view, knob 117 may be utilized to tighten second bracket 118 against second intermediate bracket 114 so as to lock viewing system 001 into a desired position.

Figure 9:
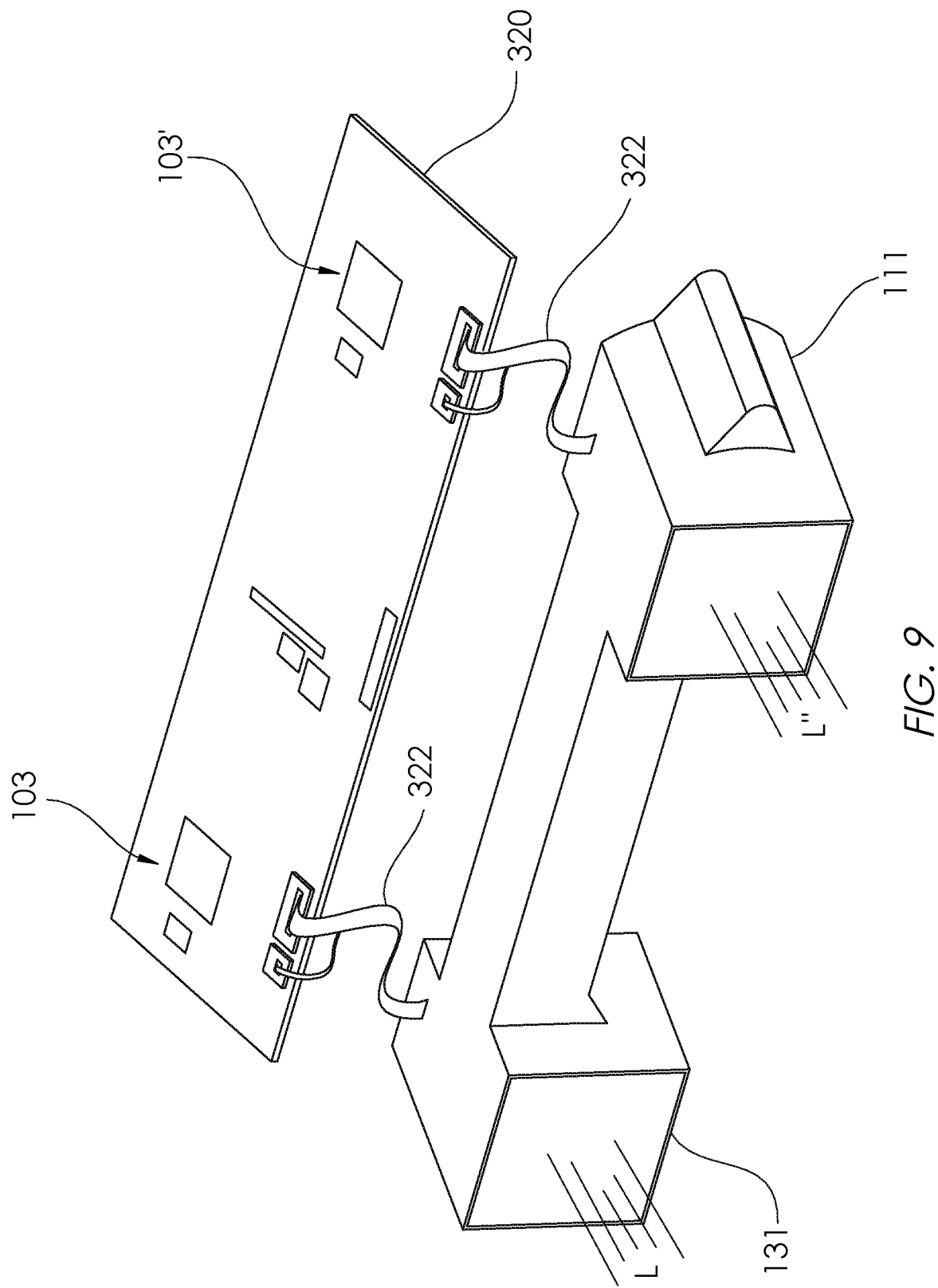
FIG. 9 depicts a perspective view of the projection system housing of the invention and further shows an embodiment of the video processors of the invention in communication with the projection system, in a stereoscopic embodiment of the invention.

Referring now to FIG. 9, a perspective view of an optional projection system housing of the invention further showing an embodiment of the video processors of the invention in communication with the projection system, in a stereoscopic embodiment of the invention, is depicted. Projection system housing 111 may enclose first projector back light source 322, second projector back light source 322', first projector LCD 104, second projector LCD 104', first projector output lens 106, and second projector output lens 106'. These components are within housing 111 and are not visible in FIG. 9. The first processed video signal from first video processor 103 may be communicated to first projector LCD 104 causing first projector LCD 104 to display a first optical output video. First projector LCD 104 may be backlit by first projector light source 322. The first optical output video image from the first processed video signal may thus be projected through first projected output lens 106 to an eye 004 of a user, which may be, for example, the user's left eye (not shown in figure). Likewise, the second processed video signal from second video processor 103' may be communicated to second projector LCD 104' causing second projector LCD 104' to display optical output video from the second video data stream. Second projector LCD 104' may be backlit by second projector light source 322'. The second optical output video from the second processed video signal may thus be projected through second projected output lens 106' to an eye 004' of the user, which may be, for example, the user's right eye. In this manner the stereoscopic view of the area to be viewed may be projected to the eyes of the viewer in a much clearer image than if shorter wavelength light in the visual spectrum had been received, processed and displayed. The first and second projector output lenses 106 and 106' respectively may be shaped so as to produce parallel output rays L simulating the users viewing a far field area to be viewed.

Referring now to FIG. 10, the optical transmission characteristics of an embodiment of the NIR optical filters 101 and 101' of the invention is depicted. In an embodiment, first and second optical filters 101 and 101' are mostly transmissive at wavelengths above 750 nm and are mostly non-transmissive at wavelengths below 750 nm More specifically, the first and second optical filters 101 and 101' may be further characterized as comprising any material that passes less than 10% of light energy at wavelengths below 850 nmm, and transmits more than 80% of light energy at wavelengths greater than 800 nm.

A method of the invention comprises illuminating an area to be viewed by an illumination source with light energy characterized by wavelength longer than 750 nm; providing a stereoscopic viewing system comprising a first video channel and a second video channel wherein the first video channel and second video channel are independent channels, and wherein the first and second video channels are for receiving light energy, converting the received light energy to an electrical video data stream, and projecting the electrical video data stream to an eye of a user and wherein the two independent channels have a field of view that, when taken together, cover the area to be viewed; receiving light energy transmitted from the illumination source that has been reflected by objects within the area to be viewed; filtering the received light energy such that only light energy characterized by wavelength longer than a critical wavelength is passed through the filter; converting the received and filtered light energy to a first and second electrical video data stream; and projecting the first and second video data stream to a first and second eye of the user, respectively.

Optional elements include NIR illumination source, supplemental NIR illumination source, video recording capability, enhanced situational awareness information overlay of data onto live video stream capability, live video stream projection, supplemental batteries, custom mounting brackets to mount the assembly housing on a specific dive mask, extreme turbid water penetration capability, underwater operations, supplemental VIS lighting and external communications capability are all optional elements that could be deleted from the core vision enhancement concept.

In alternative embodiments, the invention may further comprise extremely narrow band pass NIR filtration, Extremely narrow band NIR polarization filtration, increased auxiliary NIR lighting in the form of additional independent NIR sources stationed around the underwater targets, or implementation of a three NIR frequency composite image generation (simulating a 3 color composite image generation) for multispectral vision capability.

In yet alternative embodiments, the viewing system of the invention may be made small enough to pass into living bodies and be used as a biological imaging system that can view through turbid fluid (blood, bile urine) and cell walls.

In yet further embodiments, the viewing system of the invention may further comprise at least one transceiver in communication with the data processor, video processors, cameras, or any combination of these, such that the camera video signals, processed video signals, or both may be transmitted to a remote receiver by wireless or wired means, thus allowing remote rea-time projection and display of these video signals for remote viewing or recording purposes.

The turbid water vision system could be used as machine vision, NIR LIDAR, remote machine vision, automated vision system, multiple display vision, or any combination of machine vision concepts where turbid water is a problem for obtaining visual information. Able to operate in turbid or clear water, the UVAS components make underwater vision information available real time to a diver or accessible digitally via any form of transmission system.

The video data streams of the invention may be combined, or fused, with visual video data and or sonar data and or radar data and or GPS data and or inertial guidance data, to create multi spectral imaging and or situational awareness and enhanced visual information for use by a user.

The basic elements of the vision system of the invention may be be rearranged to create an underwater communication system capable of voice and video streaming. In this embodiment, the wide area NIR lighting source may be replaced with an NIR frequency pulsed laser and the video cameras replaced with NIR sensitive photo sensors in communication with electrical demodulators for recovering baseband data from the modulated data. The laser may be modulated using any known modulation technique, analog or digital.

In an embodiment, an underwater diver may install the vision system of the invention onto their mask or hold the vision system in front of their eyes in their field of vision and activate the electronics. Once powered on, the vision system will create and project a first person view synthetic vision experience directly into the diver's natural field of vision. The diver uses their own eyes, naturally focused at infinity to view the synthetic visual field of view. The vision provided by the vision system of the invention is accessed by looking into the projectors located at the back of the vision system; or, in the case in which remote viewing is desired, by viewing through a remote projector assembly, or in yet another embodiment, by viewing a monitor if remote transmission is an element of the assembly. The diver may then perform underwater tasks requiring vision with the added benefit of being able to clearly see objects in the viewing area despite turbid water environments.

The vision system may also be used in conjunction with mini or micro free body imaging probes or tethered and controlled imaging devices for the visualization of organs in a living being. The vision system of the invention allows for a high resolution vision experience when looking through blood, urine, lymph, other bodily fluids, cell walls, cell tissues, including skin tissue, to a limited but greatly increased distance as compared to white light illumination imaging systems. NIR illumination is not generally harmful to biologic tissue in the levels required for vision augmentation image acquiring. Biologic tissue could be well illuminated with NIR light without harming it.

Most translucent plastics, most organic dyes and most forms smoke and dust that are opaque to visible and ultra violet light. These materials are semi-transparent to NIR illumination making vision through them a possibility with an image recording device equipped with a vision system of the invention.

The vision system of the invention may also be used for viewing objects submersed in petrochemical solutions.

The vision system of the invention may also be used in biological waste treatment fluids when inspection or servicing is required when turbid water solutions are present.

The vision system of the invention may also be used in remote inspection of underwater structures or ships hulls disposed in turbid water.

The vision system of the invention may also be used in hostile underwater environments such as thermal volcanic plumes (black smokers) where the NIR vision would be able to see into the stained or otherwise opaque water.

The vision system of the invention may also be used in exploration of non-terrain worlds such as Titan or Europa as part of the vision system used by the space probes as part of a multi-spectral imaging platform.

The vision system of the invention could be used as a NIR LIDAR mapping system.

The vision system of the invention may also be used as an optical communication carrier system using pulsed NIR laser light as the directional carrier.

The vision system of the invention may also be used as a remote mapping and sensing underwater exploration vehicle.

The system and method of the invention also provides NIR night vision capability when used in air.

What is claimed is:

1. A stereoscopic vision enhancing system for providing enhanced visibility through a turbid fluid, comprising:
    an illumination source emitting light energy characterized by a bandwidth having a lower wavelength at least as great as a critical wavelength, wherein said critical wavelength is between 750 nm and 800 nm, wherein said illumination source is disposed such that said emitted light energy illuminates an area to be viewed, and wherein said critical wavelength is defined to be a maximum wavelength that is reflected by particles suspended in said turbid fluid that cause turbidity by the scattering of light energy that is of lower wavelength than said critical wavelength;
    a first video camera for receiving said light energy and converting said light energy to a first camera video signal, said first video camera having a first field of view, wherein said first video camera is disposed so that said first field of view is coincident with at least a portion of said area to be viewed, said first video camera capable of outputting a first camera video signal;
    a second video camera for receiving said light energy and converting said light energy to a second camera video signal, said second video camera having a second field of view, wherein said second video camera is disposed so that said second field of view is coincident with at least a portion of said area to be viewed, said second video camera capable of outputting a second camera video signal; wherein light energy reflected from an object in said area to be viewed is reflected towards said first video camera and said second video camera, said reflected light energy taking a first optical path from the object to said first video camera and taking a second optical path from the object to said second video camera;
    a first optical filter allowing transmission of said reflected light energy therethrough disposed in said first optical path, and a second optical filter allowing transmission of said reflected light energy therethrough disposed in said second optical path, wherein each of said first optical filter and said second optical filter are characterized as being transmissive over a filter bandwidth having a lower wavelength below which lower wavelength light energy is substantially blocked from passing through the filter and above which light energy is substantially passed through the filter;
    a first video processor for processing said first camera video signal, said video processor in electrical communication with said video camera for converting said first camera video signal to a first processed video signal, and a second video processor for processing said second camera video signal, said second video processor in electrical communication with said second video camera for converting said second camera video signal to a second processed video signal; and
    a first projector in electrical communication with said first video processor and a second projector in electrical communication with said second video processor; wherein said lower filter wavelength is at least as long as said critical wavelength; and
    wherein said first projector is capable of converting said first processed video signal to a first optical output and projecting said first optical output to a first eye of a user at optical wavelengths between 400 nm and 700 nm; and
    wherein said second projector is capable of converting said second processed video signal to an optical output and projecting said second optical output to a second eye of a user.

2. The stereoscopic vision enhancing system of claim 1, wherein said first projector is further defined as comprising a first backlit LCD screen in communication with said first video processor, and wherein said first backlit LCD screen receives said first processed video signal and converts said first processed video signal to a first output video, said first output video passing through a first projector lens, and wherein said second projector is further defined as comprising a second backlit LCD screen in communication with second first video processor, and wherein said second backlit LCD screen receives said second processed video signal and converts said second processed video signal to a second output video, said second output video passing through a second projector lens.

3. The stereoscopic vision enhancing system of claim 1, further comprising a watertight housing, wherein said first and second optical filter, first and second video camera, first and second data processor, and first and second projector are enclosed in said watertight housing, and wherein said watertight housing comprises an input optical window disposed to allow said reflected light energy to pass through said input optical window into said first and second optical filers, and wherein said watertight housing further comprises an optical output window disposed so as to allow said first output video and second output video to be projected to a first and second eye of a user, respectively.

4. The stereoscopic vision enhancing system of claim 3, wherein said watertight housing is adapted to be attached to an underwater diver's mask such that said first projected video and said second projected video are projected into the first and second eye of a user, respectively, when the user is wearing said underwater diver's mask.

5. The stereoscopic vision enhancing system of claim 1, wherein the first and second camera video signals are each further defined to be NTSC video signals, and the first and second processed video signals are each further defined to be digital video signals.

\* \* \* \* \*